April 14, 1959     N. G. SCHAFFER     2,882,093
COVERS FOR AUTOMOTIVE VANS
Filed Oct. 17, 1955
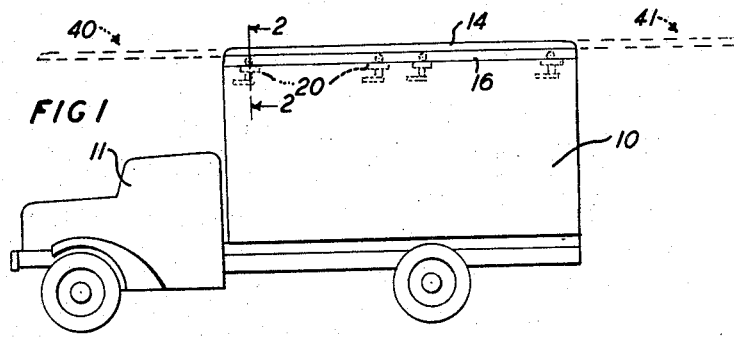
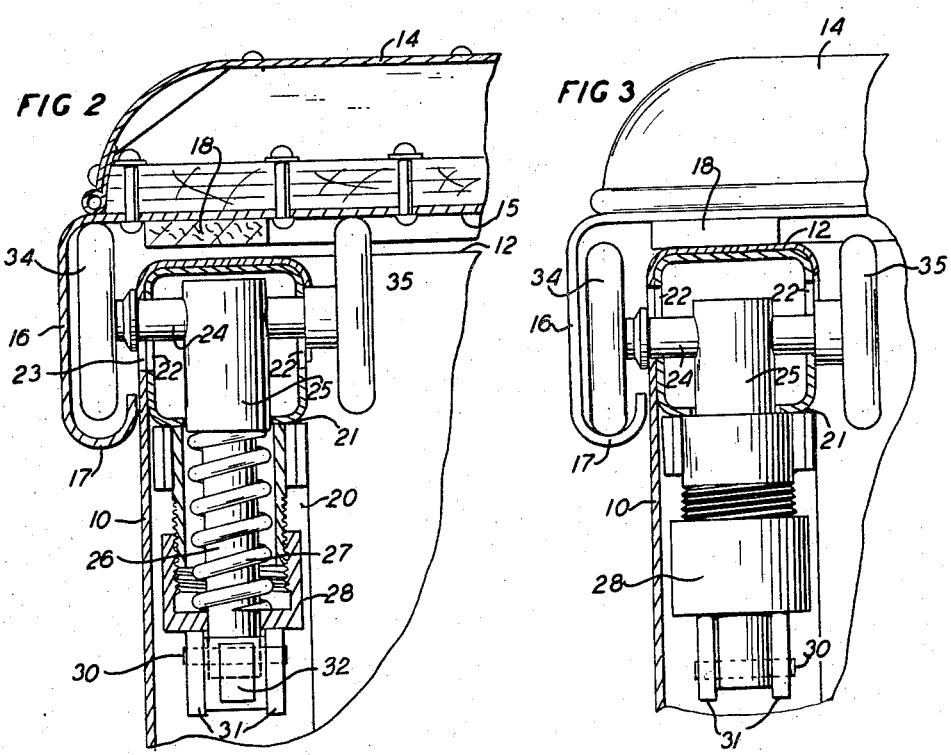
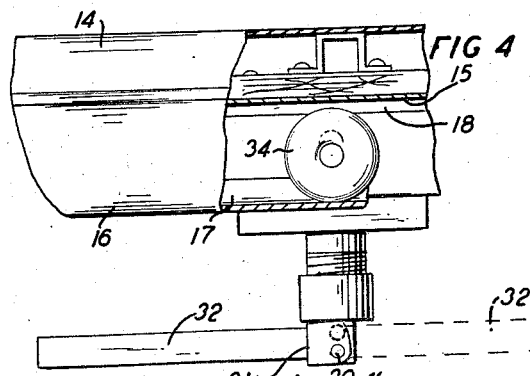
INVENTOR
N. G. SCHAFFER
BY
ATTORNEY

United States Patent Office 2,882,093
Patented Apr. 14, 1959

2,882,093

COVERS FOR AUTOMOTIVE VANS

Norman G. Schaffer, Emmaus, Pa., assignor to Western Electric Company, Incorporated, New York, N.Y., a corporation of New York Application October 17, 1955, Serial No. 540,908

5 Claims. (Cl. 296—137)

This invention relates to covers for automotive vans and more particularly to movable single covers for open top van bodies.

It is frequently desirable and sometimes necessary that a portion of the top of a van body be opened for the loading and/or unloading of objects. Numerous van bodies have been provided with various types of covers composed of sections covering approximately half the top of the body, some of the halves being permanently fixed while in certain instances both halves are movable singly. These structures are complicated in that weather sealing means must be provided, not only between the cover sections where they interengage each other near the center of the top, but between the sections and the top of the body. Where the covers are composed of one fixed section and a movable section, there is no convenient access to the area under the fixed section.

The object of the present invention is a single cover for an open top of an automotive van body which will provide access to any area of the van body through its open top.

In one embodiment of the invention, a single cover is disposed upon an open top of an automotive van body with means to support the cover for movement relative to the open top to expose any portion thereof.

More specifically the single top is a light but suitably durable structure supported when free for movement upon pairs of rollers which are parts of units, spring actuated in one direction to free the sealing means of the cover from the top and to support the top for movement either forwardly or rearwardly of the body to expose any portion thereof. The units have cam-like levers actuable to move the rollers against the forces of their springs so that certain of the rollers will engage trough-like side members to force the cover into its normally closed locked position or in any other desired locked position.

Other objects and advantages will be apparent from the following detailed description when considered in conjunction with the accompanying drawing, wherein:

Fig. 1 is a side elevational view of an automotive van embodying the invention;

Fig. 2 is an enlarged fragmentary sectional view taken substantially along the line 2—2 of Fig. 1 illustrating one of the units in open position;

Fig. 3 is a view of the structure shown in Fig. 2 illustrating the unit in closed position, and Fig. 4 is a fragmentary side elevational view of the structure shown in Fig. 3 at a reduced scale, portions of the structure being shown in section.

Referring now to the drawing, attention is directed to Fig. 1 which illustrates a body 10 of an automotive van 11 which may be of any desired size or general structure, it being important, however, that the top 12 be open. A single cover 14 is provided for the open top 12 and is constructed in any desired manner to provide a structure which is light in weight and suitably durable for the purpose intended. In the present embodiment of the invention, the cover 14 includes a lower member 15 formed preferably of a suitable metal and having its sides 16 extend downwardly and into the trough-like contours 17 as shown in Figs. 2, 3 and 4. The members 16 with their portions 17 are parallel with each other and are spaced to allow clearance upon each side of the body 10 for free movement of the cover 14 relative to the open top 12. A flexible strip 18 fixed to the member 15 of the cover 14 extends along the sides and ends of the cover to engage the top 12 to form a weather seal between the cover and the body.

A desired number of identical units 20 are mounted at spaced positions in the body 10 adjacent the top 12. These units are identical and the description of the unit shown in Figs. 2, 3 and 4 will be sufficient for all units. The unit 20 shown, for example, in Fig. 2 includes a housing 21, fixed to the body adjacent the top 12 and provided with aligned elongate apertures 22 communicating with similar apertures 23 in the body 10 for vertical movement of a spindle 24. The spindle 24 is fixed to a rod 25 by extending through an aperture therein. The rod 25 has a reduced lower portion 26 to receive a spring 27 which is held in the housing by a threaded cap 28 upon which the lower end of the spring rests. The reduced portion 26 of the rod 25 extends through an aperture in the cap 28 and its lower end is connected through a pin 30 to a bifurcated cam 31 of a cam lever 32. The bifurcated portions of the cam are of the contours shown in Fig. 4 whereby the lever 32, when moved into the dotted line position, will free the spring 27 to move the rod 25 upwardly and, when moved into the solid line position, will move the rod downwardly. Rollers 34 and 35 defined as outside and inside rollers respectively are rotatably supported by the outer ends of the spindle 24 and movable therewith into open or closed positions shown respectively in Figs. 2 and 3 during actuation of the lever into the dotted line position or the solid line position shown in Fig. 4.

Considering now the various functions of the single cover 14 it should be understood that its normal position will be its closed position where it extends over the entire open top 12 of the body 10. When in this position, the units 20 are actuated into their closed positions shown in Fig. 3 where the outer rollers 34, protected by the side members 16 of the cover, hold the cover firmly on the top while compressing the weather seal 18 against the top. Should it be desirable to expose any portion of the open top 12 of the body 10, the units 20 may be actuated into their open positions by movement of the cam levers 32 to the dotted line positions, illustrated in Fig. 4. During this action, the springs 27 are free to force their pairs of rollers 34 and 35 upwardly to apply force from each unit upon opposing sides of the weather seal 18 to break the seal from the top 12 and provide a roller support for the cover 14.

It is apparent that the cover may be moved over these pairs of rollers forwardly or rearwardly into the positions illustrated respectively at 40 and 41 in dotted lines in Fig. 1 to expose any desired portions of the open top 12. As an extreme illustration, the cover 14 may be removed entirely starting its movement either forwardly or rearwardly. Also, without removing the cover entirely, any and all portions of the open top 12 of the body 10 may be exposed. While the cover 14 is in any of these partially removed positions, the adjacent units 20 function while in their open positions to hold the cover against lateral displacement or against dropping free of the body through the association of the outer rollers 34 with the portion 17 of the side members 16 of the cover. Furthermore, if desired, the adjacent units 20 may be actuated into closed positions shown in Fig. 3 to lock the cover in any desired open position against accidental displacement.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an automotive van, a body having its entire top open with edges at the open top disposed in a given plane, a single cover for the entire open top, rollers actuable to raise the cover from the top and support it for movement thereof forwardly or rearwardly relative to the top to uncover any portion of the top, and means actuable by the rollers to secure the cover against movement on the top.

2. In an automotive van, a body having its entire top open with edges at the open top disposed in a given plane, a single cover for the entire open top, rollers actuable to raise the cover from the edges of the open top and support it for movement thereof forwardly or rearwardly relative to the top to open any portion of the top, and means actuable by the rollers to secure the cover against movement on the top in any open position.

3. In an automotive van, a body having its entire top open with edges at the open top disposed in a given plane, a single cover for the entire open top having parallel side members, and units actuable in one direction to move the cover free of the top and support it for movement forwardly or rearwardly to open any portion of the top, the units being actuable in another direction to engage the side members and apply a downward force thereto to secure the cover to the top.

4. In an automotive van, a body having its entire top open with edges at the open top disposed in a given plane, a single cover for the entire open top having parallel side members, and roller supporting units mounted at spaced positions in the body adjacent the top and actuable into open positions to raise the cover from the top and support it for movement thereof forwardly or rearwardly on the rollers relative to the top to open any portion of the top, the roller supporting units being selectively actuable to engage the side members under force to hold the cover against displacement in any open or its closed position.

5. In an automotive van, a body having its entire top open with edges at the open top disposed in a given plane, a single cover for the entire open top having parallel side members with inwardly turned flanges positioned below the plane of the top edges, and roller supporting units mounted at spaced positions in the body adjacent the top and actuable into open positions to raise the cover from the top and support it for movement thereof forwardly or rearwardly on the rollers relative to the to open any portion of the top, the units also being actuable into closed positions to engage the flanges of the side members under pressure at any position of the cover relative to the top to clamp the cover on the top.

References Cited in the file of this patent

UNITED STATES PATENTS

| 1,944,439 | Larsen | Jan. 23, 1934 |
| 2,014,140 | Larsen | Sept. 10, 1935 |
| 2,202,015 | Marinello | May 28, 1940 |
| 2,245,832 | Simpson | June 17, 1941 |
| 2,708,026 | Duell | May 10, 1955 |
| 2,757,043 | Strick et al. | July 31, 1956 |